Jan. 22, 1935. J. L. CAMPBELL 1,988,865
DISPENSING DEVICE
Filed Jan. 19, 1934
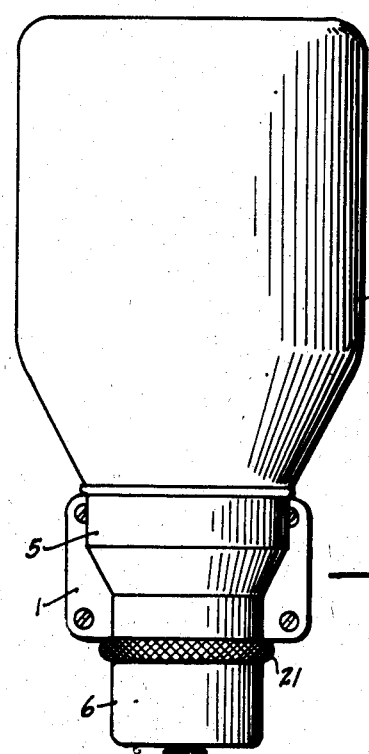
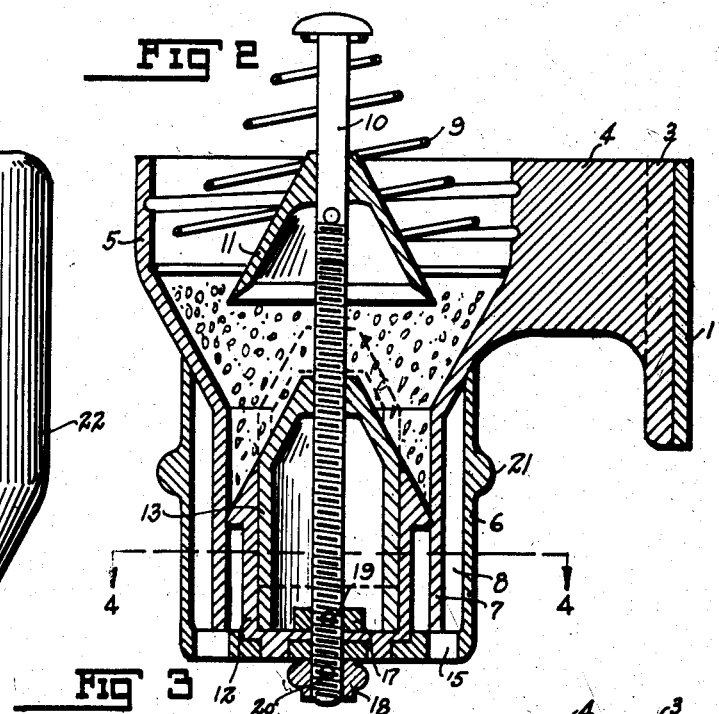
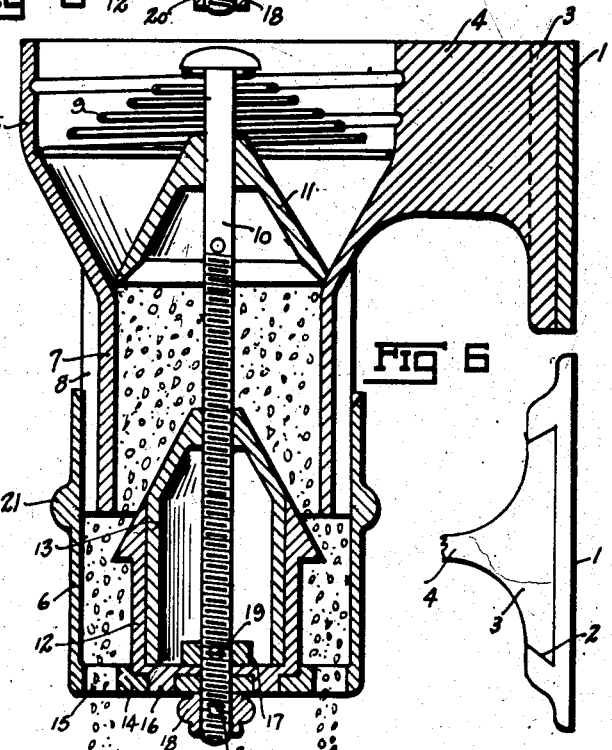
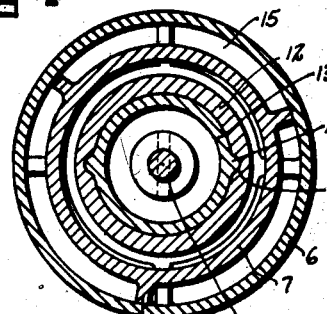
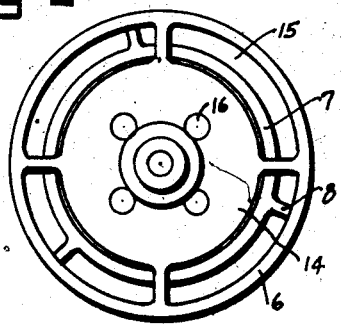
INVENTOR.
JACKSON LEE CAMPBELL
BY B. F. Funk
ATTORNEY.

Patented Jan. 22, 1935

1,988,865

UNITED STATES PATENT OFFICE 1,988,865

DISPENSING DEVICE

Jackson Lee Campbell, Wichita, Kans., assignor of one-fourth to Oliver J. Corbett and one-fourth to Otto E. Kahle, both of Chicago, Ill., and one-fourth to Fred H. Kahle, Cleveland, Ohio Application January 19, 1934, Serial No. 707,399

5 Claims. (Cl. 221—115)

This invention relates to dispensing devices and the primary object thereof is to provide a device which will deliver measured quantities of material from a package or container.

The invention is primarily intended for use in delivering measured quantities of coffee from a container or the like to a coffee maker or pot but I do not wish to be limited to any particular use of my invention.

In making coffee the general rule is to use one tablespoonful of ground roasted coffee bean for each cup of water but in order to get the best results this measured quantity should be varied to suit the strength desired by the user to compensate for the degree of roast, the blend of coffee employed and the fineness of grind so I have provided means whereby the device can be set or adjusted to deliver the exact measured quantity to produce the desired result.

The novelty of the invention will be clearly understood by reference to the following description in connection with the accompanying drawing in which:

Figure 1 is a front elevation of a device constructed in accordance with my invention.

Figure 2 is a vertical, longitudinal, sectional view through the same with the upper valve unseated and the delivery end closed.

Figure 3 is a similar view with the upper valve closed and the lower valve unseated.

Figure 4 is a sectional view on the line 4—4 of Fig. 3.

Figure 5 is a bottom plan view of the delivery member of the device.

Fig. 6 is a plan view of the wall bracket and a part of the supporting arm.

The reference numeral 1 designates a bracket which may be secured to a wall or other support in any well known manner. The bracket is provided with an undercut groove 2 to receive the dovetailed head 3 of a supporting arm 4 which carries the measuring dispenser. The measuring dispenser is shown as comprising a receiving chamber 5 and a dispensing chamber 6 so correlated that they alternately open and close, one with respect to the other so as to feed measured quantities of material such as coffee and the like from a container.

The receiving chamber 5 is in the form of a hopper having a throat 7 provided with guide ribs 8 on its exterior upon which slides the dispensing chamber 6. The hopper receives an expansion spring 9 yieldingly supporting a headed stem 10, to receive a cone shaped valve 11, the base of which is adapted to fill the throat to close it when the member 6 is in discharging or dispensing position and it coacts with the discharge valve 12 on stem 10 so that when valve 11 is in closing position valve 12 is unseated and vice versa. The valve 11 is loosely mounted on the stem 10 and seats on the bottom of the hopper 5. The valve 12 has an adjustable core member 13 of less diameter than the discharge end of the throat 7 so that it can be adjusted on the stem 10 to vary the capacity of the chamber space formed by the throat 7 so that varying amounts of the material will be delivered. This permits the operator to adjust the capacity of the device so that the proper dose of coffee will be delivered to insure proper coffee beverage strength and to compensate for differences in the variations of ground roasted coffee bean with respect to fineness of grind, degree of roast and blend as well as the individual taste of the user. The core 13 is received in the hollow member 12 and has threaded connection with the stem 10. The ribs 13' on core 13 fit the grooves 13" on member 12. This keeps the member 13 from turning while adjustment is being made.

It will be noted that the member 6 has a bottom 14 with discharge openings 15, and that the valve member 12 is provided with pins 16 received in openings in the bottom of the cup shaped member 6 so that when the member 13 is turned upon the stem 10 to adjust it longitudinally the member 12 will be held against turning thereby maintaining its valving position irrespective of the position of the core member 13.

The stem 10 loosely supports the bottom of the member 6 by the nuts 17 and 18 held against turning by the pins 19 and 20. The knurled bead 21 on the member 6 constitutes a grip so the operator may raise and lower the dispensing member to open and close the discharge end of the throat of the receiving chamber and at the same time close and open the receiving end of the throat.

It is understood of course that the hopper receives the open end of an inverted container 22 containing the material to be dispensed. When all the parts are properly assembled the member 6 is first pulled down to the position shown in Figure 3, then the container 22 will be seated in the hopper 5. The member 6 is now released so that the valve 11 is in the position shown in Figure 2 so that a measured quantity of material will fill the measuring chamber, the valve 12 at this time closing the discharge end of this chamber. By pulling down on the member 6 to bring the parts into the positions shown in Figure 3 the valve 11 will be effective in closing the inlet to the throat and will open the discharge end so the coffee or other material will discharge through openings 15 into the coffee pot or other receptacle beneath it. Upon release of the member 6 the spring 9 will retract the parts to the positions shown in Figure 2. The stem is provided with a left hand thread so that by turning button 18 the member 13 can be raised or lowered.

What I claim as new is:

1. A dispensing device comprising a bracket member, a removable hopper on the bracket member, an inverted cup shaped member slidable on the constricted part of the hopper having openings in its bottom, a spring retracted stem in the hopper connected to the cup shaped member, valves on the stem in spaced relation to alternately open and close the respective ends of the constricted part of the hopper.

2. A dispensing device comprising a hopper, having a throat, a cup-shaped member slidable on the throat having openings in its bottom and valve carried by the cup-shaped member for the discharging end of the throat, a valve for the inlet of the throat and a rigid connection between the two valves, so that one is seated when the other is unseated.

3. A dispensing device comprising a hopper, having a throat, a cup-shaped member slidable on the throat having openings in its bottom and valve carried by the cup-shaped member for the discharging end of the throat, a valve for the inlet of the throat, a rigid connection between the two valves, so that one is seated when the other is unseated, and means for normally urging the last named valve in unseated position.

4. A dispensing device comprising a hopper having a throat, a cup-shaped member slidable on the throat having openings in its bottom, a valve carried by the cup-shaped member for the discharging end of the throat, a valve for the inlet end of the throat, a rigid connection between the two valves so that when one valve is unseated, the other valve will be seated, and an adjustable valve core associated with the first named valve.

5. A dispensing device comprising a hopper having a depending throat, a cup-shaped member slidable on the throat having openings in its bottom, a valve carried by the cup-shaped member normally in the throat, a valve in the hopper for the discharging end thereof above the inlet end of the throat, a rigid connection between the two valves and a spring normally urging the last named valve away from the inlet end of the throat, the first named valve being retractable for the throat upon movement of the cup-shaped member in one direction, to permit material to flow into the cup-shaped member.

JACKSON LEE CAMPBELL.